United States Patent Office 3,218,295
Patented Nov. 16, 1965

3,218,295
COPOLYMERS OF FORMALDEHYDE WITH ACTIVE HYDROGEN-CONTAINING POLYMERS
Edward Terry Cline, Wilmington, Del., assignor to E. I. du Pont de Nemours and Company, Wilmington, Del., a corporation of Delaware
No Drawing. Filed Feb. 24, 1961, Ser. No. 91,318
8 Claims. (Cl. 260—67)

This invention relates to new compositions of matter and to their preparation, and, more particularly, it relates to copolymers containing polyoxymethylene groups. This application is a continuation-in-part of my copending application Serial No. 550,198 filed on November 30, 1955 now abandoned.

In U.S. Patent 2,768,994 issued to R. N. MacDonald on October 30, 1956, there are disclosed high molecular weight polyoxymethylene possessing a high degree of thermal stability and toughness retention. In order to vary these and other properties for specific commercial uses, it is desirable that copolymeric products be made available.

It is an object of this invention to provide new copolymers in which units of a polymeric substance are chemically bonded to units of polyoxymethylene. It is a further object of this invention to provide a process for preparing such copolymers. Other objects will be apparent from the detailed explanation of this invention.

The new copolymers of this invention comprise units of polyoxymethylene chemically bound to units of a different wholly organic polymer. The latter polymer is one which is soluble in organic hydrocarbon solvents, has a molecular weight of at least 500, and contains active hydrogen atoms as determined by the Zerewitinoff method which are present in the groups selected from the class consisting of mercapto, hydroxyl, primary amino and carboxyl. The polyoxymethylene units have a molecular weight of at least 3000.

The new copolymers of this invention are made by continuously introducing substantially pure monomeric formaldehyde into a hydrocarbon reaction medium containing, in solution, from 1% to 90%, based on the weight of the formaldehyde to be polymerized, of preformed hydrocarbon-soluble normally solid, wholly organic polymeric substance which is substantially free of tertiary amino nitrogen having a molecular weight of at least 500 and active hydrogen atoms stemming from mercapto, hydroxyl, primary amino or carboxyl groups, and from 0.00001% to 0.3% by weight of the medium of a formaldehyde polymerization initiator.

In one convenient way of operating, monomeric formaldehyde, at atmospheric pressure, is swept through purifying traps held at −15° C., then into the top of a reaction chamber held at ordinary room temperature and containing a rapidly agitated cyclohexane solution of a formaldehyde polymerization initiator and the preformed wholly organic polymer. The copolymer separates from solution as it is formed, and is isolated by filtration and vacuum drying at room temperature.

The polymerization can be operated on a continuous basis by continuously introducing formaldehyde, preformed wholly organic polymer, fresh medium and initiator into the polymerization zone, while withdrawing the copolymer in a slurry from the zone under steady state conditions.

The products of this invention are referred to as "copolymers," although they may be referred to as "block copolymers" since the polymer chain is believed to be made up of segments, or blocks, having the same recurring unit present in the preformed, wholly organic polymer united by segments of a different structure, i.e. oxymethylene units derived from the formaldehyde. The absolute structure of the copolymers is not known but they may be represented by any structure having the units $(CH_2O)_x$ and $(R)$ in any ratio, and especially $(CH_2O)_x—(R)$ and $(CH_2O)_x—(R)—(CH_2O)_y$ in which $(R)$ has a molecular weight of at least 500 and represents the preformed polymer unit (minus any active hydrogens which may be removed in the process), and $x$ and $y$ are positive integers of at least 100. The polyoxymethylene unit or units, therefore, have a molecular weight of at least 3000. The symbol R is the segment of the wholly organic preformed polymer which is free from tertiary amino nitrogen. The term "wholly organic polymer" is used to distinguish from inorganic and organo-inorganic polymers which do not have the desired solubility in hydrocarbons. More particularly, the "wholly organic polymer" may be defined as a hydrocarbon soluble polymer having a structure in which the polymer chain is composed solely of carbon atoms, or carbon atoms connected to atoms selected from the class consisting of oxygen (e.g. as in polyglycols), sulfur (e.g. as in polythiols), primary amino-nitrogen. This preformed polymer may be expressed by the formula X—R—X, where R is defined as set forth above and X is an active hydrogen-containing group selected from a group of the class consisting of OH, SH, COOH and $NH_2$ and where the aforementioned groups are the only functional groups on the polymer chain, i.e. the functional groups are exclusively of the aforementioned class.

The preferred copolymers are those derived from formaldehyde and preformed wholly organic polymers containing two active hydrogen containing groups, one on each of the terminal carbon chain, e.g. the polyglycols. This combination of reactants leads to the formation of linear copolymers.

The copolymers of this invention are characterized by good toughness, thermal stability, and plasticity, all of which make them useful in the plastic arts. Those obtained by copolymerizing formaldehyde in the presence of polyglycols have a combination of clarity, flexibility and heat stability that makes them of special interest in the preparation of films and sheets.

In the case of copolymers containing residual hydroxyl groups, it is desirable to acylate or alkylate them since this improves their thermal stability.

The examples which follow are submitted to illustrate and not to limit this invention. Parts are by weight unless otherwise stated.

EXAMPLE I

A. *Purification of formaldehyde*

Highly purified, gaseous monomeric formaldehyde was prepared from the hemiformal of cyclohexanol. The hemiformal was pumped at about 15 parts per minute into an insulated vessel which was heated sufficiently to maintain it one-half full of liquid. The vapors produced by decomposition of the hemiformal, comprising formaldehyde, cyclohexanol, and various impurities such as water, were led upward for about 2.5 feet through an insulated tube, then downward through a water-cooled bulb condenser, and then through a straight bore condenser, cooled by acetone circulating at −15° C. through the jacket. The condensate which collected at the bottom of the condenser was led to a recovery still.

The vapors were then passed upward through a bulb condenser, the interior walls of the condenser being covered with a downward flowing, countercurrent stream of heptane which had been freshly dried by passage through a silica gel column. The scrubbed gas was then passed through a vessel, cooled with an ice-water bath, to remove most of the heptane which had been picked up in the scrubber. Finally, the gas was passed through a series of three U-tubes cooled at —15° C. and packed with stainless steel wire-mesh saddles. All of the aforementioned equipment was glass or glass-lined, and it had been cleaned and baked before assembly and then flushed with dry nitrogen to exclude water after assembly.

B. *Copolymerization*

Formaldehyde gas, purified by the above procedure, was passed at about 3 parts per minute into the top of a baffled polymerization vessel which was fitted with a stirrer to provide violent agitation of the liquid contents. An exit tube from the vessel was connected in series to an empty trap, and then to a trap partly filled with an inert liquid through which the off-gas could bubble. The final bubbler served to indicate the rate of gas absorption in the polymerization vessel.

Prior to connecting the polymerization vessel with the rest of the equipment, the vessel was charged with 467 parts of cyclohexane which had been freshly dried by passage through a silica gel column. Ten parts of vacuum-dried polytetramethylene glycol, $$HO—[(CH_2)_4—O]_n—H$$

having a molecular weight of 7000, as calculated from hydroxyl number, was added to the vessel. Seventy-eight parts of cyclohexane were distilled from the vessel to remove traces of water. The vessel was then cooled and connected with the rest of the equipment as described above.

The vessel was surrounded with a water bath at 25° C. to control the temperature of the reaction. The agitator was started and when the medium was saturated with formaldehyde, as shown by the final bubbler, 0.0005 part of dimethyldi (70% octadecyl, 30% hexadecyl) ammonium acetate in cyclohexane solution was injected into the reaction medium as a polymerization initiator. Absorption of the gaseous formaldehyde was so rapid that the stirrer was run only part time during the following two minutes in order to prevent the liquid in the final bubbler from being sucked back into the empty trap. Fourteen minutes after the addition of the quaternary ammonium initiator, the polymerization vessel was disconnected, and the slurry of copolymer in cyclohexane was filtered.

The filter cake was washed with acetone and then continuously extracted several hours with acetone. The product was vacuum dried and found to weigh 34 parts. It analyzed 47.23% carbon which corresponds to copolymer having a polytetramethylene glycol content of 27.1% and a polyoxymethylene content of 72.9%.

C. *Acetylation*

An aliquot of the copolymer, prepared as above, was acetylated in solution by heating and stirring it with 18 parts (per part of copolymer) of acetic anhydride containing 0.04% of anhydrous sodium acetate, in a nitrogen atmosphere in a closed system, under reflux at a total nitrogen pressure of about 1.9 atmospheres, until the polymer dissolved. At this point a thermometer located in a well extending into the solution registered 148° C. The excess nitrogen pressure was vented and the heating and stirring were continued under reflux at 1 atmosphere under a nitrogen blanket. Thirty minutes from the time at which the mixture first reached 138° C., the acetylated polymer was precipitated rapidly from solution by applying a vacuum to the system. The acetylated polymer was filtered, exhaustively washed with acetone, water, and acetone again and finally stabilized by incorporating into the copolymer 0.1% of di-beta-naphthyl-p-phenylenediamine, and 1% of a mixture of alcohol-soluble polyamides. The yield of acetylated copolymer was 98%.

D. *Properties*

The acetylated copolymer had an inherent viscosity of 1.3 as determined at 60° C. in 0.5% solution in para-chlorophenol containing 2% of alpha-pinene. Other properties of the acetylated material and similar acetylated copolymers prepared in duplicate runs are summarized in the following tables.

TABLE I

| Properties | Acetylated Formaldehyde Copolymer | Acetylated Polyoxymethylene Control- |
|---|---|---|
| Syringe stability (222° C., ml./g.) 10-20 mins. | 2-4 | 2.5 |
| Flow No., g./10 mins. at: | | |
| 5 minutes | 0.2-2.2 | 2.1 |
| 10 minutes | 0.2-2.2 | 2.1 |
| Crystallinity, percent | 40 | 65 |
| Film brittleness temp., °C | −105 to −120 | −80 to −110 |
| Clarity | Good | Poor |
| Melting point, °C.: | | |
| Initial | 138; 162 | 173 |
| Main | 170 | |
| Final | 178 | 178 |

The syringe stability is a measure of thermal stability. In this test, a 0.75 inch diameter disk is cold-pressed from 0.6–0.7 g. of dry polymer at room temperature and a total pressure of 12,000 lbs. for two minutes. The disk is kept in a dry bottle until it is transferred to a 50 ml. syringe. The syringe is flushed with nitrogen and partly filled with an oxidation and heat-resistant silicone oil having a freezing point of −50° C. and a viscosity of 149 centistokes at 25° C. All but about 5 ml. of the oil is extruded, and the end of the syringe is closed with a polytetrafluoroethylene plug. The syringe is placed in a 222° C. vapor bath and the volume of gas evolved from the disk is recorded at intervals by observing the movement of the syringe piston. The results are expressed in terms of milliliters of gas evolved per gram of polymer during specified time intervals. Values of less than 5 between 10 and 20 minutes indicate a high order of thermal stability. These results are achieved only when the polymers are acetylated and stabilized as described above.

The flow number is determined in an extrusion test in which about 6 g. of polymer is heated in a cylinder at 200° C. The cylinder is fitted at the bottom with an orifice having a diameter of 0.0413 inch and a length of 0.158 inch. The cylinder is equipped with a tight-fitting piston having diameter of 0.373 inch. The piston is weighted to a total mass of 5060 g. The orifice is closed for the first 4.5 minutes with a polytetrafluoroethylene plug. The plug is removed and the polymer which is extruded during one-minute intervals between 5 and 10 minutes is cut off and weighed. The weight of polymer extruded between 5 and 6 minutes is plotted at 5.5 minutes on a plot of weight versus time. The other extruded portions are similarly plotted and a curve is drawn through the points. From the curve the flow rates at 5 and 10 minutes are read. These values are multiplied by ten to give so-called flow numbers expressed in g./10 minutes at 5 and 10 minutes, respectively. Polymers which have flow numbers in the neighborhood of 2 are well-suited to injection molding.

Crystallinity is determined with an X-ray diffractometer which records the reflections of the crystalline and amorphous portions of the polymer. The areas under the crystalline and amorphous peaks are determined and the percent crystallinity calcuated therefrom. For these tests films were pressed at 190° C. and allowed to cool slowly to 150° C. before removal from the press. Polyoxymethylene homopolymer under these conditions is seldom less than 65% crystalline. The value of 40% for the block copolymer represents a substantial reduction of crystallinity as compared with polyoxymethylene.

The film brittleness temperature test comprises cooling a film strip successively to lower and lower temperatures and creasing it under carefully controlled conditions between the jaws of an oversized spring-loaded clothespin. The creasing is accomplished by uniformly and slowly allowing the clothespin jaws to shut during the cooling period. The temperature at which about half of the strips in a series break is taken as the film brittleness temperature. The film for this test is prepared by pressing 1.15 g. of vacuum dried copolymer in a 2.5 inches x 0.5 inch bar mold at 40,000 lbs. total pressure for 1.5 minutes. The bar is placed in a 1⅞ inches x 2½ inches x 10 mil-thick film frame and pressed between sheets of aluminum foil at 40,000 lbs. total pressure for 1.5 minutes in a press preheated to 195° C. The press is cooled with water and the film removed. Injection molded articles prepared from polymers which have a film brittleness temperature of less than −70° C. have high toughness and are, therefore, suitable for use in a variety of applications.

Melting points are determined with a microscope equipped with a hot stage and crossed Nicol prisms.

Additional properties of films and bars prepared from the acetylated and stabilized product are shown in the following two tables.

TABLE II.—PROPERTIES OF FILMS

| Properties | Acetylated Formaldehyde Copolymer | Acetylated Polyoxymethylene Control |
| --- | --- | --- |
| Tear strength, g./mil | 7.5 | 4.0 |
| Moisture permeability (g./sq.m./day/mil) | 12,000 | 500–2,000 |
| Impact strength, kg.cm./mil | 12.4 | 5 |
| Modulus, lbs./sq. in | 68,000 | 400,000 |
| Tenacity, lbs./sq. in | 3,000 | 6,000–10,000 |
| Elongation, percent | 22 | 4–10 |

TABLE III.—PROPERTIES OF MOLDED BARS

| Properties | Acetylated Formaldehyde Copolymer | Acetylated Polyoxymethylene Control |
| --- | --- | --- |
| Method of molding | Compression. | Injection |
| Izod impact, ft.lb./in. of notch | 4.8 | 2.8 |
| Rockwell hardness | R69 | R120 |
| Yield strength, lbs./sq. in | 5,100 | 10,000 |
| Tenacity, lbs./sq. in | 4,790 | 9,500 |
| Elongation, percent | 20–140 | 95 |
| Percent water absorption at 50% relative humidity and 23° C | 0.23 | 0.13 |

EXAMPLE II

A polymerization vessel, as described, in Example I, was charged with 8.5 parts of a vinyl acetate crotonic acid copolymer containing 5% combined crotonic acid. Traces of water were removed from the copolymer by evacuating the flask at 0.2 mm. at 100–110° C. for 3 hours. Five hundred twenty-eight parts of reagent benzene was passed through a silica gel column and introduced directly into the polymerization flask. Eighty-eight parts of liquid were distilled from the flask to reduce the water content still further.

The flask was cooled to room temperature and connected with the monomeric formaldehyde generator described in Example I. The agitator was started and in 3 minutes, during which the reaction medium became saturated with formaldehyde, 0.0005 part of the quaternary ammonium initiator of Example I was injected. Agitation was continued and formaldehyde was passed into the flask continuously during the next 10 minutes, while the flask was cooled externally with a water bath at 25° C.

The rsultant slurry was filtered and the filter cake was washed and extracted continuously with acetone for several hours. The product was vacuum dried and extracted three times with water at 60–80° C. to remove remaining traces of unreacted vinyl acetate/crotonic acid copolymer. The product was then washed with acetone and vacuum dried. It had a weight of 24 parts. The product, a copolymer of formaldehyde and the vinyl acetate/crotonic acid copolymer, analyzed 45.6% carbon which corresponds to a content of vinyl acetate/crotonic acid copolymer of 32% and a polyoxymethylene content of 68%.

An aliquot of the foregoing copolymer was acetylated as described in Example I and stabilized with 0.1% by weight of di-beta-naphthyl-p-phenylenediamine. The acetylated material had an inherent viscosity of 1.75 (determined at 60° C. on a 0.5% solution in para-chlorophenol containing 2% alpha-pinene), flow numbers of 1.7 and 1.3 g./10 minutes at 5 and 10 minutes, respectively, and a syringe stability of 46 ml./g. between 0 and 10 minutes. In a film pressing test at 200° C. for 5 minutes wherein 0.50 g. of polymer was pressed at 3000 lbs. total pressure between sheets of aluminum foil, the acetylated material lost 4.4% of its weight. This compared with a loss of 0.22% for the copolymers of Example I and for values up to 1.4 for polyoxymethylene homopolymer controls.

When pressed at 190° C., the copolymer formed a tough film. A film having a thickness of 3 mils could be manually creased at an angle of 180° C. without cracking.

EXAMPLE III

A polymerization vessel was charged with 3.4 parts of a polymer containing primary amino end groups, the polymer being prepared by cyanoethylating and reducing polytetramethylene glycol. It had a neutral equivalent of 1700. Traces of water and volatile materials were removed from the vessel by evacuation at about 0.2 mm. pressure at 100–110° C. Four hundred sixty-seven parts of cyclohexane were passed through a silica gel column and introduced directly into the polymerization vessel. Seventy-eight parts of liquid were distilled out as in the preceding examples. The flask was cooled to room temperature and connected with the formaldehyde generator described in Example I.

The agitator was started and monomeric formaldehyde was passed in during a period of 10 minutes during which polymerization occurred without the addition of a quaternary ammonium initiator as in the preceding examples. The formaldehyde/polyamine copolymer which had formed was recovered by filtration, washed wtih acetone and continuously extracted several hours with acetone. The copolymer, after vacuum drying, weighed 20 parts. It analyzed 42.58% carbon corresponding to a comonomer preformed amino polymer of 9.7% in the copolymer.

An aliquot of the above product was acetylated as in Example I and stabilized as in Example II. The acetylated material had an inherent viscosity of 1.41 in para-chlorophenol determined as described in previous examples. Its flow numbers at 5 and 10 minutes, respectively, were 1.5 and 7.3 g./10 minutes. Its syringe stability was 38 ml./g. between 0 and 10 minutes. It lost 4.1% in weight in the 200° C./5 minutes/3000 lbs. film test (Example II). A 2-mil film pressed at 190° C. was tough as determined by the creasing test described in Example II.

EXAMPLE IV

A polymerization vessel was charged with 4 parts of a copolymer having a mole ratio of 40 moles of methyl methacrylate to one mole of vinyloxyethylamine and having a neutral equivalent of 4100. Five hundred twenty-seven parts of reagent grade benzene were passed through a silica gel column and introduced directly into the polymerization vessel. Eighty-eight parts of liquid were distilled from the vessel as described in the preceding example. The vessel was cooled to room temperature and connected with the formaldehyde generator described in Example I.

The agitator was started and monomeric formaldehyde was passed in during a period of 11 minutes while the vessel was cooled with a water bath at 26° C. The formaldehyde copolymer which had formed was filtered off, washed and extracted with acetone as described in Example I. The extracted copolymer was vacuum dried and found to weigh 25.4 parts. It analyzed 41.70% carbon which corresponds to 91.4% copolymerized formaldehyde and 8.6% copolymerized methyl methacrylate vinyloxyethylamine copolymer. It lost no weight in the 200°/5′/3000 lbs. film test and had a syringe stability of 12 ml./g. at 10–20 minutes. Its inherent viscosity at 60° C. and at a 0.5% concentration in para-chlorophenol was 1.96, and it was formed into a tough film.

EXAMPLE V

A polymerization vessel was charged with 10 parts of vinyl acetate/allyl acetoacetate copolymer which, on the basis of its carbonyl number, contained 90% vinyl acetate by weight. Five hundred twenty-seven parts of reagent grade benzene were passed through a silica gel column and introduced directly into the polymerization vessel. As in previous examples, 88 parts of liquid were distilled from the vessel, the vessel was cooled and connected with the formaldehyde generator.

The agitator was started and monomeric formaldehyde was passed in during three minutes to saturate the medium. The quaternary ammonium initiator of Example I, in the amount of 0.0005 part, was injected into the vessel and monomeric formaldehyde was passed in for an additional 10 minutes, while the reaction vessel was cooled with a 27° C. water bath. Gas absorption was so rapid during most of this time that the stirrer was run only part time. The insoluble formaldehyde copolymer which had formed was filtered off, washed with acetone and extracted with acetone as described previously. The extracted polymer was vacuum dried and found to weigh 42.2 parts. It analyzed 44.3% carbon corresponding 26.9% of the preformed polymer in the formaldehyde copolymer. It had an inherent viscosity in 60° C. and a 0.5% concentration in para-chlorophenol of 1.66%.

An aliquot of the product was acetylated as described in Example I and stablized as in Example II. The acetylated material had a syringe stablility of 25 ml./g. between 10 and 20 minutes and flow numbers of about 0.1 g./10 minutes at both 5 and 10 minutes. It lost only 0.34% in weight in the 200° C./5 minutes/3000 lbs. film test described in Example II. A 7.5 mil film pressed at 190° C. was tough as judged by the creasing test described in Example II. The acetylated material was incompletely soluble in either p-chlorophenol or dimethylformamide.

EXAMPLE VI

A polymerization vessel was charged with 10 parts of a polytetramethylene glycol having a molecular weight of about 7000, as determined from hydroxyl number. The vessel was evacuated at about 0.2 mm. for 4 hours at 100–110° C. The vessel was cooled to ambient temperature and 467 parts of cyclohexane, freshly passed through a silica gel column, were introduced. Seventy-eight parts of liquid were distilled from the vessel, as described previously. The vessel was cooled to ambient temperature and connected with the formaldehyde generator described in Example I; however, the generator was run at only about 75% of the rate given in Example I.

The agitator was started and after 5 minutes 0.002 part of the quaternary ammonium initiator of Example I was injected. Stirring and introduction of formaldehyde were continued for an additional 10 minutes. The polymerization mixture was filtered and the filter cake was continuously extracted with acetone for several hours. The extracted formaldehyde/polytetramethylene glycol copolymer material was vacuum dried and found to weigh 14 parts. It analyzed 54.21% carbon, which corresponds to a polytetramethylene glycol content of 53%. After acetylation its inherent viscosity at 60% and at a 0.5% concentration in parachlorophenol was 0.9.

Another copolymer, similarly prepared, analyzed 52.8% carbon, corresponding to a polytetramethylene glycol content of 48.0%. After acetylation it had an inherent viscosity at 60% and 0.5% concentration in para-chlorophenol of 1.04, a film brittleness temperature of −118° C., syringe stabilities of 11 ml./g. between 10 and 20 minutes and 6.7 ml./g. between 80 and 90 minutes, and a flow number of 15 g./10 minutes at 5 minutes. It lost 0.60% in weight in the 200° C./5 minutes/3000 lbs. film pressing test.

EXAMPLE VII

A polymerization vessel was charged with 6.25 parts of a copolymer having a mole ratio of 1 mole of vinyloxyethylamine to 22 moles of isobutyl methacrylate and having a neutral equivalent of 3160, and 527 parts of reagent grade benzene, freshly passed through a silica gel column. Eighty-eight parts of liquid were distilled from the vessel to remove traces of water, as described previously. The vessel was cooled and connected with a formaldehyde generator as described in Example I.

The agitator was started and after 5 minutes 0.0005 part of the quaternary ammonium initiator of Example I was injected. Monomeric formaldehyde was passed in and agitation was continued for seven more minutes, during which time the reaction vessel was cooled with a 29° C. water bath. During this time gas absorption was so rapid that the stirrer was operated only part time. The reaction mixture became very thick. It was filtered and washed with acetone, and continuously extracted with acetone, as described previously. The polymer was vacuum dried and found to weight 26 parts. It analyzed 41.04% carbon, which corresponds to a content of 3.8% of vinyloxyethylamine/methyl methacrylate copolymer, the remainder of the copolymer being oxymethylene chains.

An aliquot of the product was acetylated as described in Example I and stabilized as described in Example II. The acetylated material had an inherent viscosity at 60° C. and at a 0.5% concentration in para-chlorophenol of 2.4, flow numbers of 0.1 and 0.1 g./10 mins., at 5 and 10 mins. respectively, and a syringe stability of 10.1 ml./g. between 10 and 20 mins. It lost only 0.16% in weight in the 200° C./5 mins./3000 lbs. film test, as described in Example II. A film of 4-mil thickness, pressed at 190° C. was tough. The material had a film brittleness temperature (determined as described in Example I) of −70° C.

Repetition of Example I using a castor oil modified glyceryl triphthalate resin having an acid number of 5–8 and a hydroxyl equivalent of 378, as the comonomer produced a copolymer, a portion of which was soluble in benzene while the other portion was insoluble in benzene. The benzene-insoluble portion had an inherent viscosity at 60° C. and at 0.5% concentration in para-chlorophenol of 2.4, a flow number of 0.4, and a syringe stability of 16.4 ml./g. between 10 and 20 mins. The product analyzed 47.32% carbon, which corresponds to an alkyd resin content of 25.5% by weight. The benzene-soluble portion analyzed 66.5% carbon which corresponds to an oxymethylene content of about 8% by weight.

Products varying widely in molecular weight were also obtained using as the comonomer, in the process of Example I.

(1) A copolymer having 40.4% stearic triglyceride, 59.0% glycerol phthalate and 0.6% excess glycerine;
(2) Polyethylene glycol phthalate;
(3) Cellulose acetate having a degree of substitution of 2.9;
(4) N-isobutyl polyhexamethylene adipamide; and
(5) Polydioxolane.

The results are summarized in Table IV.

TABLE IV

| Comonomer | Carbon Content of Product (Percent by Weight) | Calculated Comonomer Content of Product (Percent by Weight) | Inherent Viscosity[1] of Acetylated Product |
|---|---|---|---|
| 1 | 45.7 | 20.2 | 2.65 |
| 2 | 40.41 | 4.2 | 1.33 |
| 3 | 43.64 | 16.2 | 1.81 |
| 4 | 41.65 | 19.1 | 1.01 |
| 5 | 43.72 | 12.0 | 2.07 |

[1] Determined at 60° C. and at 0.5% concentration in para-chlorophenol.

The comonomers which are operable in the preparation of the products of this invention are those wholly organic polymers which are chemically different from polyoxymethylene, which are soluble in organic hydrocarbon solvents, which have a molecular weight of at least 500, and preferably 1000, which are substantially free of tertiary-amine groups and which contain active hydrogen atoms, as determined by the Zerewitinoff method [Ber. 40, 2026 (1927), J. Am. Chem. Soc. 49, 3181 (1927)], derived from hydroxyl, mercapto, primary amino and carboxyl groups. Examples of such polymers include polyglycols other than polymethylene glycol, e.g., polyethylene glycol and polybutylene glycol, reduced ethylene/carbon monoxide copolymers, polythiols, e.g. polybutylenethiols, polyamines containing primary amino groups, e.g. reductively aminated ethylene/carbon monoxide copolymers, reduced methyl methacrylate/acrylonitrile copolymers, methyl acrylate/vinyloxypropylamine copolymers, reduced butadiene/acrylonitrile copolymers, reduced cyanoethylene/styrene copolymers, reduced acrylonitrile/methallyl acetoacetate copolymers, etc., copolymers containing carbonyl groups, e.g. vinyl acetate/methacrylic acid copolymers, vinyl acetate/acrylic acid copolymers, hydrolyzed styrene/methyl methacrylate copolymers, glyceryl triphthalate-long chain fatty acid modified resins, hydrolyzed methyl acrylate/vinyl ether copolymers, methyl vinyl ketone/acrylic acid copolymers and the like.

In general, the copolymers of this invention may vary in the weight ratio of the polyoxymethylene component to the preformed organic polymer component from about 99:1 to about 10:90.

In practice, the comonomer (the preformed polymer) is dissolved in the reaction medium and the formaldehyde is passed into the space above the agitated solution. As an alternative the formaldehyde may be injected into the agitated comonomer solution.

The polymerization process, in general, is that described and claimed in U.S. Patent 2,768,994 issued to R. N. MacDonald on October 30, 1956, although other polymerization initiators may be employed.

As shown in the examples, acylation leads to improved thermal stability and this after-treatment is therefore generally given the polymer if its ultimate use entails resistance to heat-degradation.

The amount of reaction medium can be from 1.5 to 1000 or more times the weight of the monomeric formaldehyde being polymerized, depending on, among other things, whether a batch or continuous process is being utilized. Because good results are obtained when the reaction medium is 4–100 times the weight of the formaldehyde being polymerized, that constitutes the amount of reaction medium usually used.

The polymerization is effected in the presence of known initiators for the polymerization of formaldehyde to polyoxymethylene. Examples of such initiators are the trihydrocarbonphosphines, arsines, and stibines disclosed in U.S. Patent 2,828,286 issued to R. N MacDonald on March 25, 1958; the tertiary amine-containing polymers disclosed in U.S. Patent 2,844,561 issued to M. F. Bechtold and R. N. MacDonald on July 22, 1958; the metal carbonyls disclosed in U.S. Patent 2,734,889 issued to F. C. Starr, Jr. on February 4, 1956; the metal organic compound disclosed in U.S. Patent 2,848,437 issued to W. P. Langsdorf, Jr. and G. S. Stamatoff on August 19, 1958; and the onium salts including quaternary ammonium salts and quaternary phosphonium salts, disclosed in copending application of H. H. Goodman, Jr. and L. T. Sherwood, Jr., U.S. Ser. No. 785,135 filled January 6, 1959 now United States Patent 2,994,687. The preferred initiators are the quaternary ammonium carboxylate.

The amount of formaldehyde polymerization initiator can vary from 0.00001 to 0.3% or more by weight of the reaction medium.

The copolymerization is effected at temperatures which can be as low as the freezing point of the reaction medium or as high as the boiling point of the reaction medium. The particular temperature selected depends upon the initiator used, reaction medium, and other conditions. The temperature selected is that at which copolymer is formed rapidly and with minimum of apparatus requirements. As a rule, these conditions are fulfilled in the range of $-50°$ to $+50°$ C. and this, therefore, embraces the preferred temperature range.

Monomeric formaldehyde from any source can be used in the practice of this invention. A convenient way for obtaining monomeric formaldehyde is by pyrolyzing alpha-polyoxymethylene, or a hemiformal. In any case, before introducing the monomeric formaldehyde into the polymerization zone it should be rigorously purified, as described in Example I, or in any other manner which will produce monomeric formaldehyde of 99.9% by weight purity.

The reaction medium is preferably one which is a non-solvent for the formaldehyde copolymer but is a solvent for the preformed polymer. The medium is also one which remains liquid under the temperature conditions used in the polymerization and which is essentially anhydrous. Alkanes of the $C_5$ to $C_{10}$ range and mixtures thereof are preferred reaction media because of their availability and low cost, and because they fulfill the aforementioned requirements. In place of these, there can be used other saturated hydrocarbons such as cyclohexane, methyl cyclohexane, isobutane, and the like.

Reaction media which dissolve appreciable amounts of monomeric formaldehyde can also be used. Specific examples are dioxane, benzene, toluene, acetonitrile, and the like.

As previously stated, the structure of the copolymers of this invention is not known, but it is believed that they are made up of segments, or blocks, formed by growing formaldehyde chains from the active hydrogen-containing polymer structure.

The copolymers of the invention yield tough clear sheets and moldings, particularly structures, such as, fibers, films, and bristles and other articles made from synthetic resins. These formaldehyde copolymers possess a high order of thermal stability and retain toughness on aging. They are therefore valuable in commerce and are the first known copolymers containing polyoxymethylene chain units.

The present copolymers may be stabilized according to the methods applicable to polyoxymethylene homopolymers which include, but are not limited to, the systems set forth in the United States Patents 2,810,708 issued October 22, 1957 to Kubico et al.; U.S. 2,871,220 issued January 27, 1959 to MacDonald; 2,893,972 issued July 7, 1959 to Kubico and MacDonald; 2,920,059 issued January 5, 1960 to MacDonald and Roedel; 2,964,500 issued December 13, 1960 to Jenkins and Punderson and 2,966,476 issued December 27, 1960 to Kralovec & Richardson.

I claim:
1. A block copolymer containing 10–99% by weight of segments which are oxymethylene chains having a molecular weight of at least 3000 joined to 1–90% by weight of segments which are the residues of a preformed, hydrocarbon soluble organic polymer having a chain composed of atoms selected from the class consisting of carbon atoms and carbon atoms connected to atoms selected from the class consisting of oxygen, sulfur and primary amino nitrogen, having a molecular weight of at least 500, being substantially free of tertiary amino nitrogen and having at least one active hydrogen-containing group selected from the class consisting of mercapto, hydroxyl, primary amino, and carboxyl.

2. A block copolymer containing 10–90% by weight of segments of oxymethylene chains having a molecular weight of at least 3000 joined to 1–90% by weight of segments which are the residues of a preformed, hydrocarbon soluble, organic polymer having the main chain consisting predominantly of carbon atoms, having a molecular weight of at least 500, being substantially free of tertiary amino nitrogen and having at least one active hydrogen-containing group selected from the class consisting of mercapto, hydroxyl, primary amino, and carboxyl.

3. A polyalkylene glycol modified by the substitution of a chain of oxymethylene groups for at least one active hydrogen atom in the glycol prior to said substitution; said glycol, disregarding said chain, having a molecular weight at least 500 and comprising 1–90% by weight of the entire modified glycol; said chain comprising the remainder of the modified glycol; and having a total molecular weight of at least 3000.

4. A polytetramethylene glycol modified by the substitution of a chain of oxymethylene groups for at least one active hydrogen atom in the glycol prior to said substitution; said glycol, disregarding said chain, having a molecular weight of at least 1000 and comprising 1–90% by weight of the entire modified glycol; said chain comprising the remainder of the modified glycol and having a total molecular weight of at least 3000.

5. A process for preparing a copolymer comprising dissolving a preformed, organic polymer different from polyoxymethylene having the main chain consisting predominantly of carbon atoms attached to atoms being members selected from the class consisting of carbon, nitrogen, sulfur, and oxygen, having a molecular weight of at least 500 and having at least one active hydrogen-containing group being a member of the group selected from the class consisting of OH, SH, COOH and NH$_2$ and a formaldehyde polymerization initiator in a liquid, saturated hydrocarbon having 5 to 10 carbon atoms per molecule, agitating the resulting solution as formaldehyde gas, containing at least 99.9% by weight of formaldehyde, is continuously introduced into, and absorbed by said solution while said solution is maintained at a temperature of from −50° C. to +50° C. and at atmospheric pressure, recovering particles of a copolymer having a molecular weight of at least 3000 and comprising 1% to 90% by weight of segments which are residues of said preformed polymer and 99%–100% by weight of oxymethylene chains, subjecting said copolymer to the action of acetic acid anhydride and recovering a thermally stable, acylated copolymer.

6. A process for preparing a copolymer comprising dissolving a polytetramethylene glycol, having a molecular weight of at least 1000, and a quaternary ammonium carboxylate in a liquid, saturated hydrocarbon having 5 to 10 carbon atoms per molecule, agitating the resulting solution as formaldehyde gas, containing at least 99.9% by weight of formaldehyde, is continuously introduced into, and absorbed by, said solution while said solution is maintained at a temperature from −50° C. to +50° C. and at atmospheric pressure, recovering particles of a copolymer comprising 1%–90% by weight of segments which are residues of said polytetramethylene glycol, each of said segments having a molecular weight of at least 1000, and 99%–10% by weight of oxymethylene chains which have a molecular weight of at least 3000, subjecting said copolymer to the action of acetic acid anhydride and recovering a thermally stable, acylated, copolymer.

7. A film comprising the copolymer of claim 1.
8. A fiber comprising the copolymer of claim 1.

References Cited by the Examiner

UNITED STATES PATENTS

| | | | |
|---|---|---|---|
| 2,044,730 | 6/1936 | Kuehn | 260—73 |
| 2,296,249 | 9/1942 | Austin | 260—67 |
| 2,350,350 | 6/1944 | Gresham | 260—615 |
| 2,768,994 | 10/1956 | MacDonald | 260—67 |
| 2,844,561 | 7/1958 | Bechtold et al. | 260—67 |
| 2,994,687 | 8/1961 | Goodman et al. | 260—67 |
| 2,998,409 | 8/1961 | Nogare et al. | 260—67 |

FOREIGN PATENTS 1,054,343   6/1936   France.

OTHER REFERENCES

Butler et al.: Journal American Chemical Society, 79, 3128, June 20, 1957.

Fieser et al.: Organic Chemistry 2nd Ed., p. 202, Heath and Co., Boston, Mass. (1950).

WILLIAM H. SHORT, *Primary Examiner.*

HAROLD N. BURSTEIN, JOSEPH R. LIBERMAN, *Examiners.*

UNITED STATES PATENT OFFICE
CERTIFICATE OF CORRECTION

Patent No. 3,218,295                                November 16, 1965

Edward Terry Cline

It is hereby certified that error appears in the above numbered patent requiring correction and that the said Letters Patent should read as corrected below.

Column 1, line 18, for "polyoxymethylene" read -- polyoxymethylenes --; column 6, line 6, for "45.6%" read -- 45.06% --; column 7, line 39, for "in 60° C. and a 0.5%" read -- at 60° C. and at a 0.5% --; column 11, line 12, for "10-90%" read -- 10-99% --; column 12, line 5, for "99%-100%" read -- 99%-10% --; line 43, for "1,054,343  6/1936 France" read -- 1,054,343  1/1952 France --.

Signed and sealed this 19th day of July 1966.

(SEAL)
Attest:

ERNEST W. SWIDER
Attesting Officer

EDWARD J. BRENNER
Commissioner of Patents